(12) United States Patent
Willeford

(10) Patent No.: US 7,958,518 B1
(45) Date of Patent: Jun. 7, 2011

(54) PROVIDING ENHANCED INTERACTIONS WITH SOFTWARE SERVICES

(75) Inventor: James C. Willeford, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1015 days.

(21) Appl. No.: 11/768,830

(22) Filed: Jun. 26, 2007

(51) Int. Cl.
*G06F 15/163* (2006.01)

(52) U.S. Cl. .................. 719/330; 719/313; 717/124

(58) Field of Classification Search .................. 719/330
See application file for complete search history.

(56) References Cited

U.S. PATENT DOCUMENTS

| | | | |
|---|---|---|---|
| 6,253,252 B1* | 6/2001 | Schofield | 719/315 |
| 2005/0268309 A1* | 12/2005 | Krishnaswamy et al. | 719/330 |
| 2008/0126409 A1* | 5/2008 | Weber et al. | 707/104.1 |

OTHER PUBLICATIONS

Grand, M., Patterns in Java, vol. 1: A Catalog of Reusable Design Patterns, Wiley Computer Publishing, 1998, pp. 79-85, 235-242.*
Fielding, R.H., "Architectural Styles and the Design of Network-based Software Architectures" (2000), University of California, Irvine [retrieved from http://www.ics.uci.edu/~fielding/pubs/dissertation/fielding_dissertation.pdf on Jan. 20, 2011].*
Panda, D., "An introduction to service-oriented architecture from a java developer perspective," ONJava.com, Jan. 26, 2005, accessed May 29, 2007, from http://www.onjava.com/lpt/a/5592, 9 pages.
About Spring, Springframework.org, accessed May 29, 2007, from http://www.springframework.org/about, 1 page.

* cited by examiner

*Primary Examiner* — Hyung S Sough
*Assistant Examiner* — Brian Wathen
(74) *Attorney, Agent, or Firm* — Seed IP Law Group PLLC

(57) ABSTRACT

Techniques are described for providing enhanced interactions with software services, such as when executing software programs use remote software services. For example, if a software program is executing on a first computing system and using remote services provided by one or more other computing systems, one or more local software proxies may be executed on the first computing system to represent the remote services. The software program may interact in a common manner with the local software proxies, while each local software proxy may interact with its corresponding remote service in a manner specific to that remote service and transparent to the software program. Furthermore, a local software proxy may facilitate software program testing, such as by interacting with a local copy of a remote service rather than the actual remote service during testing and/or by emulating asynchronous message interactions with a remote service during testing.

47 Claims, 6 Drawing Sheets

PROVIDING ENHANCED INTERACTIONS WITH SOFTWARE SERVICES

TECHNICAL FIELD

The following disclosure relates generally to providing enhanced interactions between software programs and software services.

BACKGROUND

As the use of the Internet and the World Wide Web ("Web") has become widespread, it is increasingly common for users to access and use various types of capabilities provided by remote computing systems over the Web, including to search for, shop for and order items (such as products, services and/or information) that are for purchase, rent, lease, license, trade, evaluation, sampling, subscription to, etc. In addition to such user-initiated interactions, software programs on remote computing systems may also interact for various purposes and in various ways. For example, there is growing use of the Web to provide so-called "Web services," which typically involve the programmatic interaction of remote applications to exchange information via defined APIs ("application program interfaces"). Web services allow heterogeneous applications and computers to interact, and may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services. The use of Web services to enable software programs to interact is in some situations referred to as one example of a service-oriented architecture.

In addition to the use of Web services, various other types of programmatic interaction mechanisms are known in which multiple software programs interact in order to achieve a goal. For example, remote procedure call ("RPC") protocols have long existed that allow a program on one computer to cause a program on another computer to be executed, and various object-oriented and other architectures such as CORBA ("Common Object Request Broker Architecture"), Java RMI ("Remote Method Invocation"), JavaSpaces, Jini, JXTA, UPnP ("Universal Plug and Play"), and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

While the use of remote software services by software programs provides various benefits, various problems also exist. For example, each remote service will typically provide its own mechanism for others to access the remote service, such that a software program using multiple remote services may need to manage and support various different access mechanisms (e.g., synchronous method invocation for a first remote service and asynchronous message passing for a second remote service, use of different communication protocols or technologies for different remote services, etc.), which increases the complexity of creating and maintaining the software program. In addition, debugging and other testing of software programs that use remote services may be difficult, as problems that arise during testing may be due to problems in interactions with the remote services (e.g., due to intermittent network problems).

DETAILED DESCRIPTION

Techniques are described for, among other things, providing enhanced interactions with software services, such as to provide additional capabilities when software programs make use of remote software services as part of the operation of the software programs. In at least some embodiments, when a software program is executing on a first computing system and uses a remote service provided by a distinct second computing system, the enhanced interactions include executing a software proxy on the first computing system that represents the remote service. The software program may in at least some such embodiments interact in a common manner with multiple such local software proxies representing multiple distinct remote services (e.g., via synchronous method invocation of interface methods provided by the local software proxies), while each software proxy may interact with its corresponding remote service in a manner that is specific to that remote service (e.g., via asynchronous message passing, synchronous remote method invocation, etc.) and that is transparent to the software program. Furthermore, in at least some such embodiments, a local software proxy may facilitate testing of software programs in various ways, such as by interacting with a local copy of a remote service rather than the actual remote service during testing (e.g., to eliminate problems that may occur due to network connections), and/or by emulating asynchronous message interactions with a remote service during testing when actual communications with the remote service do not actually occur. Additional details related to such software proxies and their uses are included below. In addition, in at least some embodiments, the described techniques are automatically performed by an embodiment of a Service Proxy Manager system, as described in greater detail below.

Figure 1:
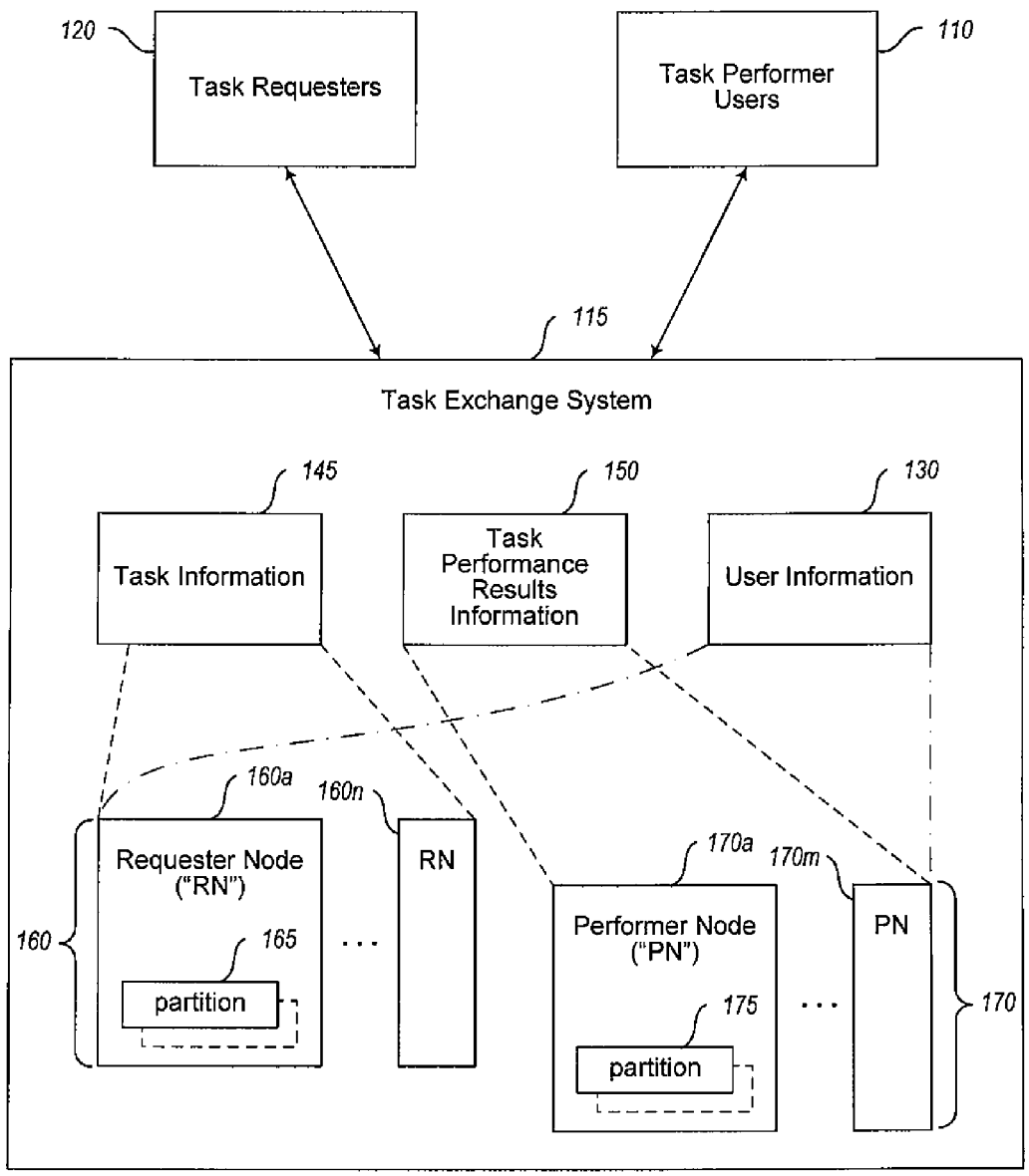
FIG. 1 is a network diagram illustrating an example of users interacting with a remote system that stores various data and provides various types of functionality.

FIG. 1 is a network diagram that illustrates an example of users interacting with a remote system that stores various data and provides various types of functionality, with embodiments of such a system able to use various of the described techniques for enhanced access to remote software services.

In particular, in this example embodiment, the system storing the data is a task exchange system 115 that stores data related to tasks and to users who supply and/or perform the tasks, and that provides functionality related to performance of tasks. For illustrative purposes, some embodiments are described herein in which specific types of users interact with specific types of systems in specific ways, and in which the systems store specific types of data and provide specific types of related functionality, including specific types of techniques for enhanced access to remote software services. These examples are provided for illustrative purposes and are simplified for the sake of brevity, and the inventive techniques can be used in a wide variety of other situations, some of which are discussed herein.

The task exchange system 115 may be implemented in various ways in various embodiments, such as in the form of a software system executing on one or more computing systems or devices (e.g., in a distributed manner, such as on a peer-to-peer or grid network). In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the system 115 may enable the submission and performance of such human performance tasks. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

In the example of FIG. 1, various task requesters 120 interact with the task exchange system 115 (e.g., by sending requests to the system 115 and receiving corresponding responses as appropriate) in order to supply tasks that are available to be performed by others, as well as to perform other related activities. For example, in addition to supplying tasks, a task requester may interact with the system 115 to obtain results from the performance by other users of previously supplied tasks, to obtain information about an account of the task requester (e.g., information about financial payments made to other users for performing tasks supplied by the task requester, information about previously specified preferences, etc.), to search for information about tasks and/or about users who are available to perform tasks, to specify types of qualifications that users may need to perform supplied tasks, etc. The task requesters 120 may take various forms, such as a task requester user who interactively accesses the system 115 (e.g., via a GUI, or graphical user interface, displayed on a computing system of the task requester user, not shown, such as a GUI based on Web pages provided by the system 115 and/or based on execution of a client-side application on the computing system), or a software application that is programmatically interacting with the system 115 (e.g., via an API of the system 115, not shown) on behalf of a related task requester user.

When a task requester supplies information about one or more tasks, the system 115 stores the task-related data as part of task information 145, which may then be made available to other users to perform the tasks in a manner specified by the task requester or otherwise determined by the system 115. The supplied information for a task may include a variety of types of information, including details related to the task (e.g., information to be analyzed, a question to be answered, etc.), one or more qualifications of any task performer user who performs the task, one or more geographical locations associated with the task, one or more capabilities and/or other current characteristics of one or more devices to be used as part of performing the task, one or more other criteria related to task performance (e.g., deadlines for completion, format of results from task performance, etc.), one or more associated rewards (e.g., monetary payments) to be provided to one or more task performer users who successfully perform the task, etc.

The system 115 stores various data across multiple alternative storage partitions in this example embodiment, such that at least some types of data are stored only on a single partition. In particular, in this example embodiment, the system 115 organizes data based on users with which the data is currently associated, so as to store a group of data related to a particular user together on a particular storage partition. Thus, for example, when a particular task requester user supplies information about a new task, the system 115 determines an appropriate storage partition to store the information about the new task along with other information related to the task requester user. If the task requester is an existing user who already has information stored in a particular storage partition on a particular computing node, the system 115 may merely select that existing storage partition. Alternatively, If the task requester user is a new user or otherwise does not currently have an existing associated storage partition, the system 115 may determine an appropriate storage partition by considering one or more of a variety of types of information, such as about possible storage partitions, about the new user, and/or about other users that are related to the user.

In this example, the system 115 includes various alternative computing nodes 160 that store data related to task requester users, including example requester computing nodes 160a and 160n. As illustrated in detail with respect to requester node 160a, each requester node may include one or more storage partitions 165 that each store data related to one or more task requester users. Accordingly, in this example embodiment, the system 115 determines a particular storage partition on one of the requester nodes that corresponds to the particular task requester that supplied information about the new task, such as a first partition 165 on requester node 160a. Furthermore, in this illustrated embodiment, the computing node associated with a storage partition corresponding to a task requester user not only provides storage of data related to the task requester user, but also provides at least some of the system 115 functionality for the task requester user via an executing software program (not shown), such as to process and respond to various types of requests received from the task requester user. The computing nodes may have various forms in various embodiments, such as to each be a distinct physical computing system, to be one of one or more virtual machines hosted on a physical computing system, to include multiple physical computing systems working in concert, etc. In addition, in other embodiments storage partitions may have other forms, such as to be split across multiple computing systems and/or to be stored on dedicated storage devices that do not themselves provide additional computing capabilities.

Thus, when a task requester user supplies information about a new task, the task-related information is in this example embodiment stored together on a single storage partition with at least some other information specific to the task requester user. In this example, the various task information 145 for the system 115 is stored in a distributed manner across the partitions 165 of the requester nodes 160, although in other embodiments such task information may be associated with other users in at least some situations (e.g., to temporarily associate information about a task with a task performer user while the task performer user is performing the task).

As previously noted, various types of information other than about supplied tasks may also be associated with task requester users and grouped together on storage, including various administrative information (e.g., contact information, payment-related information, previously specified user preferences, etc.) and information about previous interactions with the user. Such user information may be supplied by the user and/or generated by the system 115, and is stored as user information 130 by the system 115 in this example. As is illustrated, such user information may be stored by the requester nodes 160 when the user information corresponds to task requester users, but may additionally be stored on task performer computing nodes 170 when the user information corresponds to task performer users. In a manner similar to the requester nodes 160, the system 115 includes various alternative task performer nodes 170 in this example, including performer nodes 170a and 170m. As illustrated in detail with respect to performer node 170a, each performer node may include one or more storage partitions 175 that each store data related to one or more task performer users.

Thus, when a task performer user 110 submits a request to or otherwise interacts with the system 115, the interaction is handled in a manner similar to that previously described with respect to the task requester users 120. The interaction may be, for example, to initiate performance of a specified task that is supplied by a task requester user, to obtain information about an account of the task performer (e.g., information about financial payments received from other users for performing tasks supplied by those other users, information about previously specified preferences, etc.), to search for information about tasks and/or about other users, to provide information about qualifications of the task performer user that may assist in performing various types of supplied tasks, etc. The task performer users 110 may similarly interact with the system 115 in various ways, such as via a GUI of the system 115 that is displayed on computing devices (not shown) of the task performer user.

As with requests from or other interactions by task requesters, after receiving a request from a particular task performer user, the system 115 determines an appropriate storage partition for the task performer user on one of the performer nodes 170, such as a first partition 175 on performer node 170a. For existing task performer users, a storage partition that already stores data for the task performer user may be quickly determined via retrieval of information from a lookup table or other mapping that maintains information about such associations. For new task performer users, an appropriate storage partition may be selected in a manner similar to that previously discussed for task requester users, such as based on information about the possible storage partitions, about the new user if such information is available, and/or about other users that are related to the user if such information is available. As one specific example, if information is available about types of tasks that the new task performer user has an affinity for performing, the system 115 may desire to store the new user's data on a storage partition that is proximate to one or more storage partitions that store data for task requester users who supply tasks of those types. Moreover, in embodiments in which at least some nodes may act as both requester nodes and performer nodes (or in which distinctions are not made between requester nodes and performer node, such that there is merely a group of computing nodes that may each store requester-related and/or performer-related data), the data for the new task performer user may be co-located on a particular storage partition with the data for one or more related task requester users who supply types of tasks for which the task performer user has an affinity.

After determining the appropriate storage partition for the task performer user, the system 115 transfers control of handling the task performer user's interaction to the computing node associated with the storage partition. For example, if the interaction is a request by the task performer user to perform a specified task supplied by a task requester user, the computing node associated with the task performer user's storage partition may interact with the computing node associated with that task requester user's storage partition to retrieve information about the task to be performed, such as under control of a software program (not shown) that is executing on the computing node associated with the task performer user's storage partition in order to provide some of the functionality of the system 115. In so doing, in some embodiments, the task information may be temporarily associated with the task performer user's storage partition while the task is being performed, while in other embodiments the task information may remain associated with the task requester user's storage partition but otherwise provide access to the information for the task performer user. After the task performer user performs the task (which may involve the task performer user supplying information and/or performing offline activities external to the system 115 and the task performer user's computing device), information about the results of the task performance are stored in the task performance user's storage partition, and may be made available to the task requester user in various ways (e.g., by automatically forwarding them to the task requester, supplying them to the task requester when the task requester user requests them, etc.). The aggregate task performance results information from the various task performer users then provides the task performance results information 150 for the system 115.

Figure 2A:
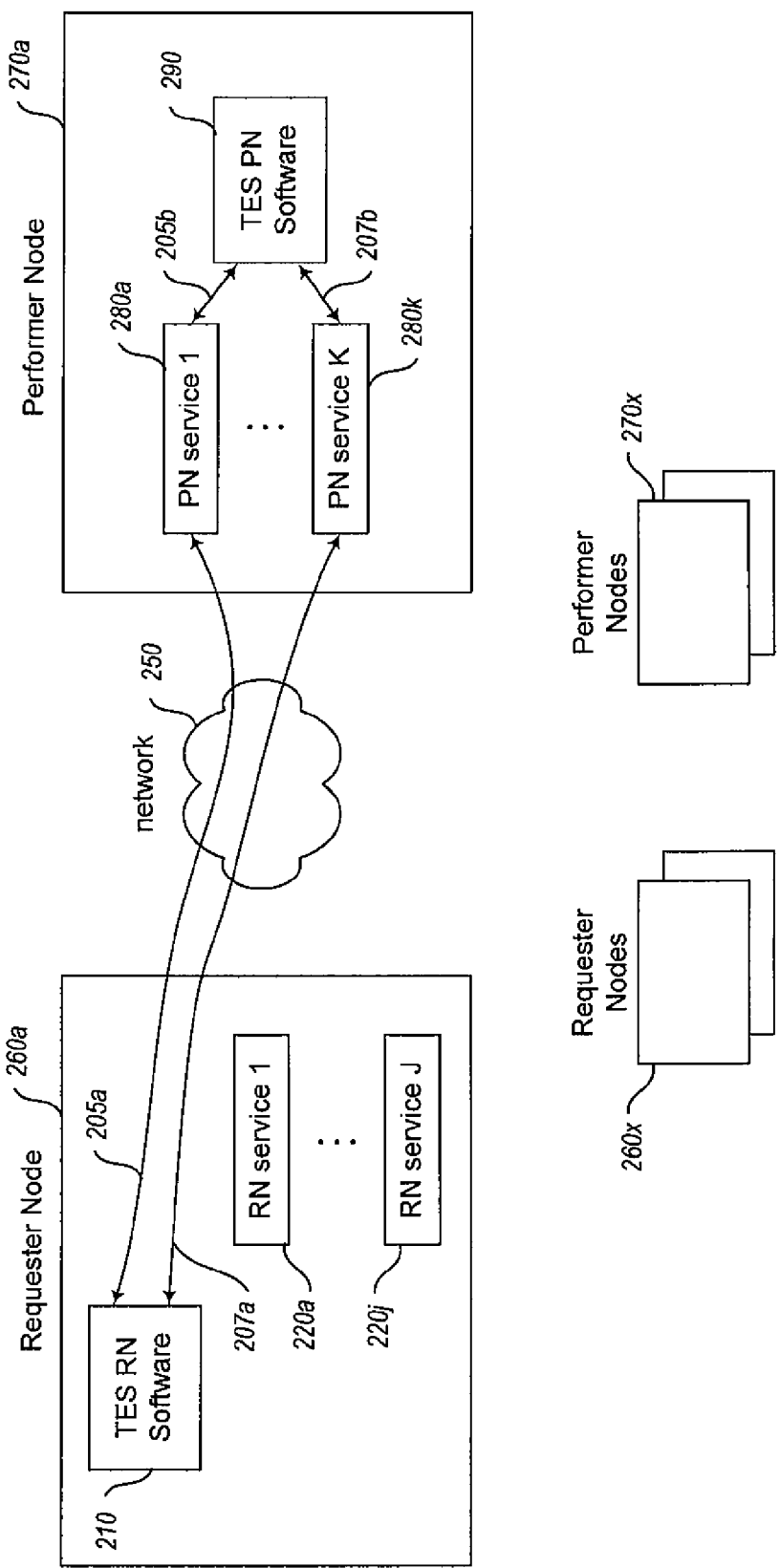
FIGS. 2A-2C illustrate examples of interactions between an embodiment of a software program and embodiments of remote software services.

Thus, the example system 115 stores various types of data and provides various types of functionality to users, which in this example embodiment are task performer users and task requester users acting as clients of the system 115. FIG. 2A illustrates portions of system 115 in additional detail, such as to illustrate how computing systems within the system 115 may in at least some embodiments use remote services provided by other computing systems.

In particular, FIG. 2A illustrates examples of one of the requester nodes 160 (shown here as node 260a) and one of the performer nodes 170 (shown here as node 270a) in additional detail to show example interactions that occur between them via a network 250 (e.g., a network internal to the system 115). In this example embodiment, requester node 260a includes an executing software program 210 to provide functionality related to the operation of the requester node (e.g., to handle interactions with requesters and with other computing nodes and computing systems within the system 115). In addition, in this example, requester node 260a further provides various services 220a-j that other computing nodes of the system 115 may access related to operations of the requester node. For example, as previously discussed, the requester node 260a may store data related to one or more task requester users in one or more storage partitions (not shown), including data related to tasks supplied by the task requester user(s) for performance by task performer users. Accordingly, at least some of the services 220a-j may provide functionality to other computing nodes related to those tasks, such as to provide information about the tasks, to assign the tasks to task performer users so that those users may perform the tasks, to issue qualifications to task performer users from task requesters, etc.

The example performer node 270a in FIG. 2A is similar to requester node 260a, and in particular includes an executing software program 290 to provide functionality related to the operation of the performer node (e.g., to handle interactions with performer users and with other computing nodes and computing systems within the system 115). In this example, the performer node 270a further provides various services 280a-k that other computing nodes may access related to operations of the performer node. For example, as previously discussed, the performer node 270a may store data related to one or more task performer users in one or more storage partitions (not shown), including data related to tasks being performed by the task performed user(s), the results of prior performance of tasks by the task performer user(s), etc. Accordingly, at least some of the services 280a-k may provide functionality to other computing nodes related to the task performer users and their activities, such as to provide information about the task performer users (e.g., qualifications of the task performer users to perform tasks), to provide information about task performance results, etc.

In FIG. 2A, two example interactions 205a and 207a between the requester node 260a and performer node 270a are shown, which in this example both include the requester node software program 210 interacting with services 280 of the performer node 270a. For example, interaction 205a may include a synchronous invocation of a first service 280a (e.g., via remote method invocation or similar synchronous interaction mechanism), while interaction 207a may include an asynchronous interaction with a second service 280k (e.g., by asynchronously sending one or more messages, such as from a message queue on node 260a, not shown). In this example, services 280 on performer node 270a are provided as part of the software program 290, and thus the software program handles the interactions with the services. In particular, when service 280a receives the interaction 205a, it communicates 205b with the software program 290 so that the software program may take appropriate action. Similarly, when service 280k receives the interaction 207a (which may be delayed relative to the initiation of the interaction, since it is sent in an asynchronous manner), the service 280k communicates 207b with the software program 290 so that the software program may take appropriate action. In some situations, the actions by the software program 290 may include sending back one or more responses to the received interaction, such as to send data that is requested by the received interaction, or to send the results of attempting to perform a requested action. In such situations, the responses will be sent back to software program 210 over the network 250.

Other requester nodes 260x and performer nodes 270x may include components similar to those of nodes 260a and 270a, respectively, and may perform similar interactions to those of nodes 260a and 270a, but are not shown in detail in this example. In addition, in at least some embodiments, the requester nodes 260x may perform various interactions between themselves and/or with requester node 260a, and the performer nodes 270x may perform various interactions between themselves and/or with performer node 270a, although such interactions are not illustrated here. In this manner, various computing nodes of the system 115 may interact in various ways by accessing services provided by other computing nodes, and thus provide and/or receive various functionality.

Figure 2B:
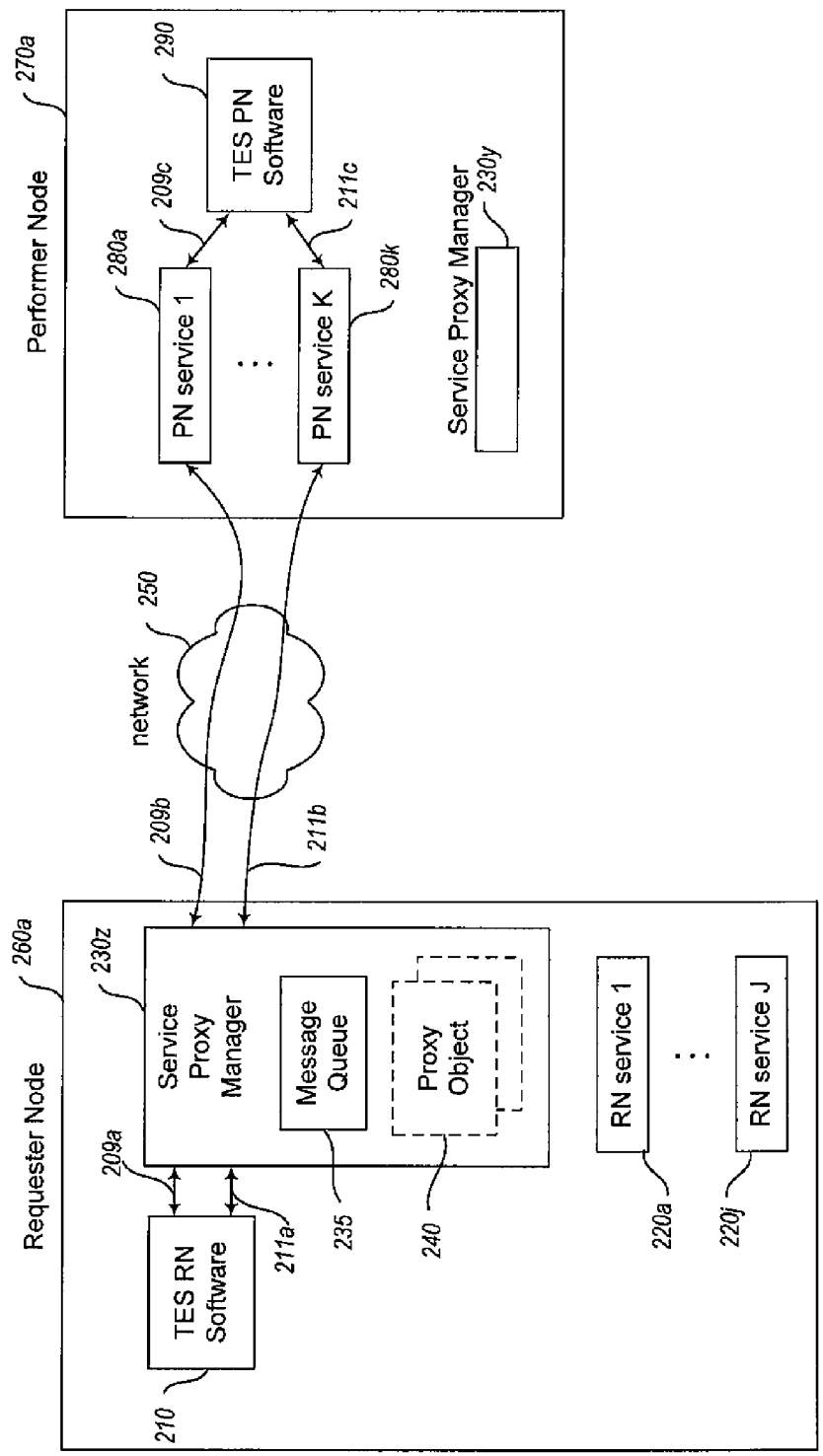
Figure 2C:
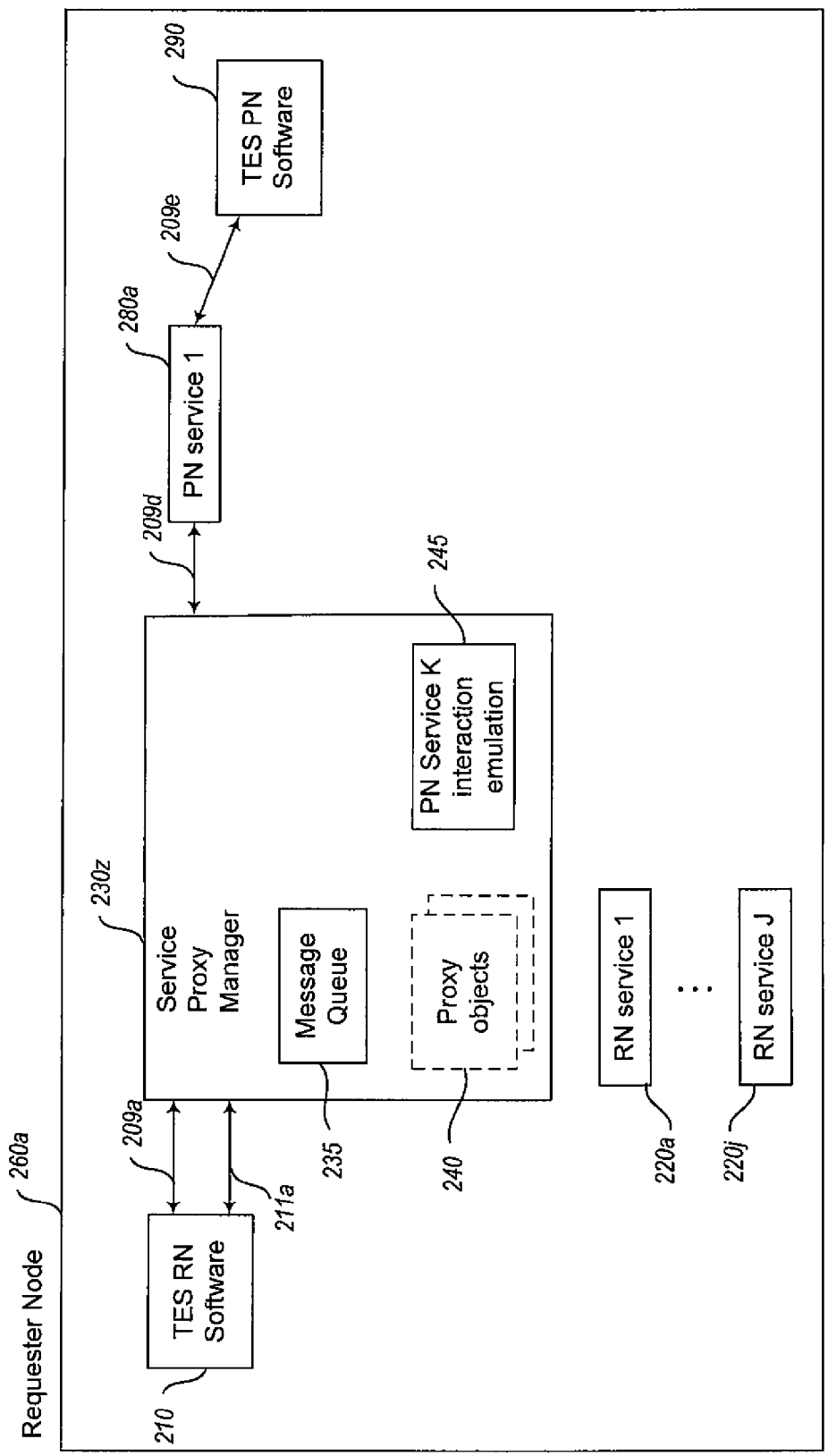

FIGS. 2B and 2C are similar to FIG. 2A in illustrating how portions of system 115 may in at least some embodiments use remote services provided by other computing systems, but further illustrates examples of providing enhanced interactions with remote services in at least some situations. In particular, FIG. 2B illustrates example requester node 260a, performer node 270a, and network 250 in a manner similar to that of FIG. 2A, with requester node 260a including software program 210 and services 220a-j, and with performer node 270 including software program 290 and services 280a-k. However, the nodes 260a and 270a in FIG. 2B each include an embodiment of a service proxy manager system to enhance interactions with remote services, with node 260a including service proxy manager system 230z and with node 270a including service proxy manager system 230y. In this example embodiment, the additional requester nodes 260x and performer nodes 270x are not shown for the sake of brevity, but may be present in other embodiments.

In this example, the software program 210 on requester node 260a initiates interactions with services 280a and 280k on performer node 270a, similar to those discussed with respect to FIG. 2A, but in this example embodiment the software program 210 does not directly interact with those remote services. Instead, the two interactions performed by the software program 210 are shown as 209a and 211a in this example, and each are interactions with the local service proxy manager system 230z. The interactions may occur in various ways in various embodiments, including as synchronous invocations of functionality provided by the local service proxy manager system 230z. For example, in some embodiments the local service proxy manager system 230z may include one or more software service proxy objects 240, such as to have a distinct proxy object that represents each remote service available to requester node 260a. In some embodiments and situations, a remote software service may provide a single operation, which is represented by and accessible via a single proxy object. In other embodiments and situations, a particular remote software service may make multiple distinct operations available. If so, a single proxy object may represent all of the operations in some such embodiments (e.g., by providing an invocable interface method for each of the operations), while in other such embodiments multiple distinct proxy objects may represent the software service (e.g., if each proxy object represents one of the operations available from the remote service. When a remote software service makes multiple operations available, the operations may further differ in various ways in various embodiments, including by having one or more of the operations of a service operate synchronously and one or more other of the operations of the service operate asynchronously. In embodiments in which proxy objects 240 are used, the software program 210 may initiate interaction 209a with remote service 280a on performer node 270a by synchronously invoking a first proxy object 240a (not shown) that represents remote service 280a (e.g., by invoking an interface method provided by proxy object 240a), and may initiate interaction 211a with remote service 280k on performer node 270a by synchronously invoking a second proxy object 240b (not shown) that represents remote service 280k (e.g., by invoking an interface method provided by proxy object 240b). In other embodiments, some or all of the interactions between the software program 210 and the local service proxy manager system 230z may be performed in other manners, such as via asynchronous message passing.

A proxy for a remote service may have various forms in various embodiments, including an executable software component, a software applet that executes within or in coordination with a service proxy manager system, an object in an object-oriented language or system (e.g., an object in a programming language such as Java, Ruby, Perl, etc.), an object that implements a class interface used by the corresponding remote service, etc. As one example, some programming languages or environments may allow an interface to a service to be defined, and then dynamically generate objects at the time of execution to correspond to and support such defined service interfaces. In at least some such embodiments, the objects or other proxies may execute together with a software program that uses the objects or other proxies, such as together in a single execution process. Furthermore, in some embodiments and situations, a remote service may include all relevant functionality to implement and provide capabilities corresponding to a provided operation (e.g., all business logic for a particular business-related operation), and if so a proxy for that remote service may merely receive and forward parameters or other received information to and from the remote service. In other embodiments and situations, a proxy may instead include some or all functionality to implement and provide capabilities corresponding to an operation provided by a remote service, such as to provide local functionality during a testing mode. When such a proxy includes functionality to implement capabilities of a remote service, and the proxy executes together with a software program that uses the proxies in a single execution process, the functionality of the proxy may provide various benefits (e.g., to assist in testing, such as by allowing more comprehensive debugging within the execution process). Additional details related to the use of proxies and remote services in various situations are included below.

For each of the initiated interactions 209a and 211a (whose occurrences may or may not be separated by a period of time) from the software program 210, upon receiving an indication of the interaction, the service proxy manager system 230z initiates a corresponding interaction with the intended remote service in a manner specific to that remote service. In embodiments in which the software program 210 directly interacts with one or more proxy objects 240 of the service proxy manager system 230z, those proxy objects may perform the corresponding interactions with the remote services that they represent. In this example, upon receiving the indication of interaction 209a intended for remote service 280a, the service proxy manager system 230z initiates a corresponding interaction 209b over network 250 with remote service 280a on performer node 270a. Interaction 209b is performed in this example in a manner similar to interaction 205a of FIG. 2A, with a synchronous invocation (e.g., via remote method invocation or similar synchronous interaction mechanism) of remote service 280a. Similarly, upon receiving the indication of interaction 211a intended for remote service 280k, the service proxy manager system 230z initiates a corresponding interaction 211b over network 250 with remote service 280k on performer node 270a. Interaction 211b is performed in this example in a manner similar to interaction 207a of FIG. 2A, with an asynchronous interaction (e.g., by asynchronously sending one or more messages). If a remote service provides a response to the service proxy manager system 230z for an interaction performed by the service proxy manager system 230z on behalf of the software program 210, whether immediately or at a later time, the service proxy manager system 230z then completes the interaction originally initiated by the software program 210 by forwarding the received response to the software program 210.

In the illustrated embodiment, the service proxy manager system 230z further includes a message queue 235 that facilitates asynchronous interactions with remote services by storing outgoing asynchronous messages that have not yet been sent. In other embodiments in which proxy objects are used, at least some of the proxy objects that perform asynchronous interactions may instead each maintain a separate message queue for that proxy object. In the illustrated embodiment, the service proxy manager system 230z periodically (or at other specified times) checks the message queue 235 and sends any messages in the queue that are ready to be sent to their intended destinations. In the illustrated embodiment, a message is removed from the message queue 235 when the service proxy manager system 230z receives an indication that the remote service received the message, although in other embodiments the messages may be removed at other times (e.g., after it is sent without verification of receipt by the remote service). Furthermore, in some embodiments, the service proxy manager system 230z may retry to perform at least some interactions with remote services that have failed, whether for synchronous and/or asynchronous interactions, such as with a first retry after 10 seconds, a second retry after 60 seconds, a third retry after 300 seconds, and with failure reported if the third retry fails, or such as by changing a synchronous interaction that initially fails to an asynchronous interaction in which an asynchronous message to the remote service will later be tried. When a message is sent to a remote service or an interaction is otherwise initiated with a remote service, the service proxy manager system 230z may further in some embodiments and situations provide a response back to the software program 210 to indicate that the interaction with the remote service has been initiated, or in other embodiments may respond immediately to a received interaction from the software program 210 (e.g., with a null message) even before the interaction with the remote service has been initiated. The service proxy manager system 230y on performer node 270a may perform similar actions for outgoing interactions from the software program 290 to remote services, but the system 230y and such interactions are not illustrated in detail here.

Thus, in this example, software program 210 initiates its interactions with remote services 280a and 280k in a single consistent manner (which in this example is a synchronous invocation of service proxy manager system 230z or one of its proxy objects 240), despite the fact that the two remote services in this example use different interaction methodologies (with remote service 280a providing a synchronous invocation interaction methodology, and with remote service 280k providing an asynchronous message passing interaction methodology). Furthermore, in at least some embodiments, the manner of the interactions between the service proxy manager system 230z and the remote services may be concealed from or otherwise transparent to the software program 210, such that the software program 210 may be unaware that interactions with remote service 280a are performed synchronously by service proxy manager system 230z and/or may be unaware that interactions with remote service 280k are performed asynchronously by service proxy manager system 230z. In addition, as previously discussed, interactions with remote services may further vary in other manners in some embodiments, such as by using differing communication protocols or other interaction methodologies with various remote services, and any such differences may similarly be concealed from or otherwise transparent to the software program 210 in at least some embodiments.

As previously noted, FIG. 2B illustrates examples of how an embodiment of the service proxy manager system may enhance interactions with remote services in various ways. FIG. 2C similarly illustrates examples of how an embodiment of the service proxy manager system may enhance interactions by a software program with remote services, but in these examples enables a local mode in which interactions with remote services are emulated or other simulated in a manner local to the software program. In particular, in the example embodiment of FIG. 2C, the local service proxy manager system 230z on requester node 260a will respond to interactions initiated by the software program 210 that are intended for remote services, but will do so without sending communications over the network or otherwise interacting with those services on their remote computing nodes. The actions of a service proxy manager system to provide such a local mode of operation may provide various benefits in various situations, including to enable improved testing on a single physical computing system of software program 210, of the remote services 280, and/or of the software program 290, such as to eliminate difficulties that may arise due to problems with network communications.

FIG. 2C illustrates an example of requester node 260a that is similar to requester node 260a in FIG. 2B, but in this example embodiment the performer node 270a and network 250 of FIG. 2B are not shown for the sake of brevity, although they may be present and operating in some embodiments. The example requester node 260a in FIG. 2C further includes a local copy or other representation of service 280a and a local copy or other representation of software program 290, and the illustrated embodiment of the service proxy manager system 230z includes a module 245 to emulate interactions with remote service 280k. As previously described in FIGS. 2A and 2B, services 280 and software program 290 typically would execute on distinct performer node 270a, and in some embodiments the actual software program 290 and services 280 may continue to execute on performer node 270a and interact with other computing nodes while the service proxy manager system 230z on requester node 260a interacts with the local copies and local emulation on requester node 260a as discussed below.

In this example, in a manner similar to that of FIG. 2B, the software program initiates an interaction 209a that is intended for remote service 280a on performer node 270a, and the service proxy manager system 230z on requester node 260a receives the interaction. However, in this example embodiment, the service proxy manager system 230z is configured to operate in a local mode, such as for a temporary time (e.g., during a current testing session). Accordingly, rather than initiating an interaction 209b over the network to remote service 280a on performer node 270a, as illustrated in FIG. 2B, the service proxy manager system 230z instead interacts 209d with the local copy of service 280a that is present on the requester node 260a. It will be appreciated that the underlying method of interacting with the local copy may be different than the method that would be used to interact with a remote copy, such as if the interactions with the remote copy use a network-based remote invocation, and the interactions with the local copy use a distinct type of local invocation. In addition, in some embodiments, the local copy 280a may not be the same as the remote service 280a on performer node 270a, such as if the local copy merely simulates responses with a predetermined set of data or other responses rather than generating dynamic responses based on current data and other conditions. In the illustrated embodiment, however, the local copy does operate in the same manner as would the remote service 280a on performer node 270a, and responds to the interaction 209d by interacting 209e with a local copy of the software program 290 on requester node 260a to dynamically respond to the received interaction 209d. Any responses from the local software program 290 and/or local service 280a may then be sent back to the software program 210 via the service proxy manager system 230z in a manner similar to that of FIG. 2B.

In the example illustrated in FIG. 2C, the software program also initiates an interaction 211a that is intended for remote service 280k on performer node 270a, and the service proxy manager system 230z on requester node 260a receives the interaction, in a manner similar to that of FIG. 2B. However, rather than initiating an interaction 211b over the network to remote service 280k on performer node 270a, as illustrated in FIG. 2B, the service proxy manager system 230z instead interacts with a module provided as part of the illustrated embodiment of the service proxy manager system 230z to emulate asynchronous interactions with service 280k. For example, the emulated interactions 245 may generate responses or other actions in a manner similar to that of the remote service 280k on performer node 270a as discussed in FIG. 2B, such as to include delays that may occur due to simulated processing or simulated dropped messages, or to include failures to respond based on simulated dropped messages or other possible problems. In other embodiments, the emulation of asynchronous message passing may include performing a synchronous invocation (e.g., with a local copy that represents service 280k, not shown), which may optionally be supplemented with other emulated delays or responses. Any responses from the emulated interactions 245 may be sent back to the software program 210 by the service proxy manager system 230z in a manner similar to that of FIG. 2B.

It will be appreciated that in some embodiments a local mode as described above may include only local copies of remote services or only emulations or simulations of interactions, that the local mode may be used for only a subset of possible remote services (e.g., so as to interact with some remote services over the network on their remote computing nodes, and to interact with other remote services via local mode interactions), and that a local mode of operation may be provided in other manners. For example, rather than providing the local copies of services 280 and/or program 290 on requester node 260a, copies of the services 280 and/or of program 290 may execute on one or more other computing nodes distinct from 260a and 270a, so as to redirect interactions over network 250 or another network to the other computing node(s), rather than to performer node 270a as would normally occur. Furthermore, the provision of such a local mode may also provide benefits other than for testing in some embodiments, such as to temporarily or permanently shift interactions from an existing computing node that was providing remote services (e.g., from computing node 270a) to one or more substitute or new computing nodes, such as if the prior computing node becomes unavailable or is overloaded. Such shifting of interactions or other use of local mode operations may, for example, facilitate temporary maintaining of system 115 operations when problems occur (e.g., if computing node 270a fails, or if network connectivity to computing node 270a fails), or facilitate temporary or permanent load balancing of interactions with one or more remote services (e.g., if services 280 are duplicated so as to be available from multiple computing nodes, or if a subset of services 280 are permanently moved from computing node 270 to a new computing node).

By use of the service proxy manager system in the manner described with respect to FIG. 2C, the use of local mode operations may also be concealed from or otherwise transparent to the software program 210, similarly to the transparency of the types of remote interactions that were discussed with respect to FIG. 2B. Thus, the software program 210 may be unaware that interactions with remote service 280a are performed via the local copy and/or may be unaware that interactions with remote service 280k are emulated by the service proxy manager system.

In this example embodiment, the techniques for enhanced interactions with remote services are provided and used by a task exchange system. By enabling large numbers of unaffiliated or otherwise unrelated task requesters and task performers to interact via the intermediary task exchange system in this manner, free-market mechanisms may be used to efficiently perform tasks with location-based and/or device-based criteria regarding task performance. Additional details related to examples of interactions of users with particular embodiments of task exchange systems are included in pending commonly-owned U.S. patent application Ser. No. 10/990,949, filed Nov. 16, 2004 and entitled "Providing an Electronic Marketplace to Facilitate Human Performance of Programmatically Submitted Tasks," and in pending commonly-owned U.S. patent application Ser. No. 11/396,286, filed Mar. 31, 2006 and entitled "Facilitating Content Generation Via Messaging System Interactions," each of which is hereby incorporated by reference. Nonetheless, it will be appreciated that the described techniques may further be used with a wide variety of other types of systems and in other types of situations.

Figure 3:
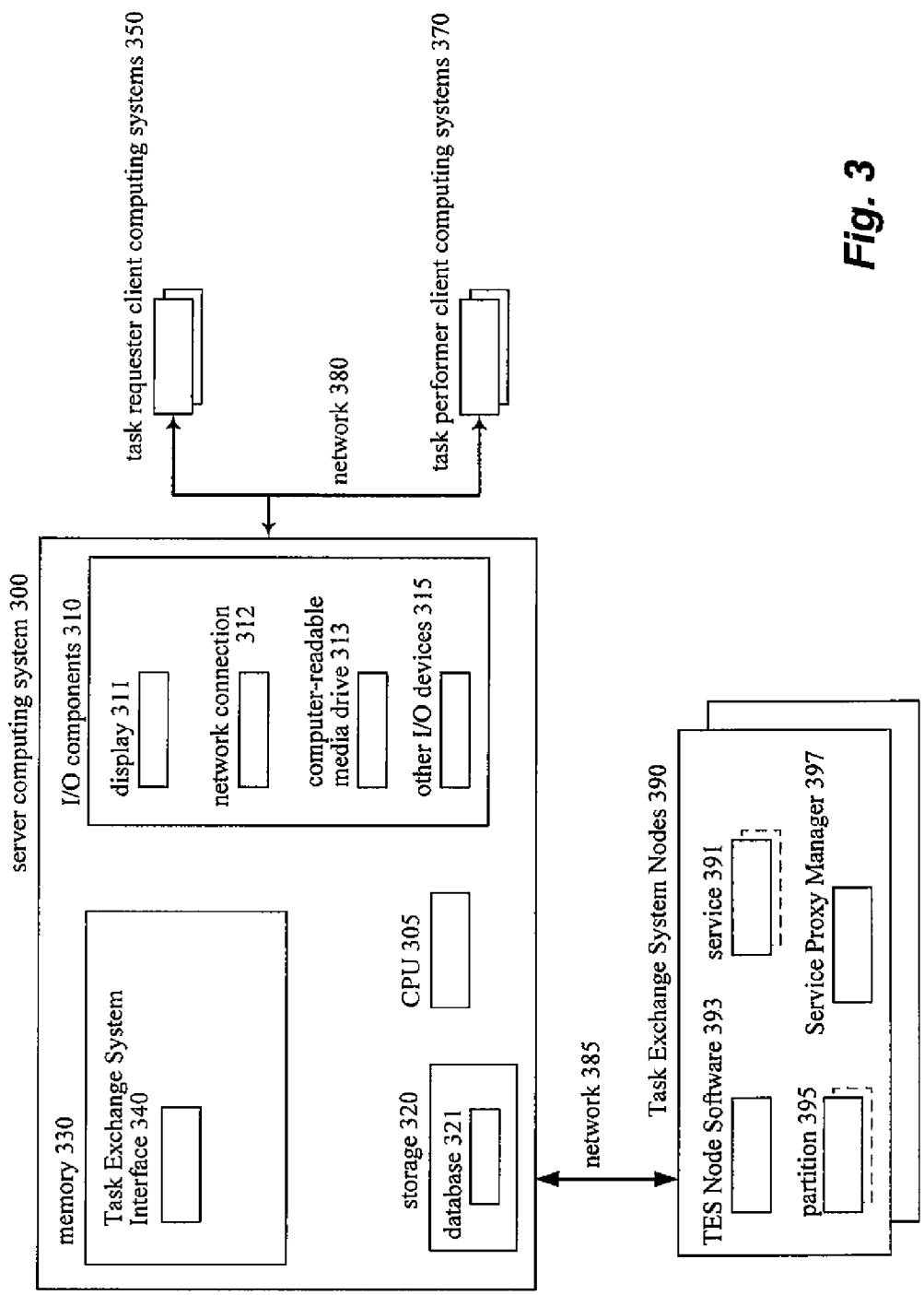
FIG. 3 is a block diagram illustrating an example computing system suitable for executing an embodiment of a system for providing enhanced access to stored data.

FIG. 3 is a block diagram illustrating example computing systems suitable for performing techniques for providing enhanced interactions with remote software services in various situations. In particular, FIG. 3 illustrates a server computing system 300 suitable for executing an embodiment of an interface to a task exchange system, as well as various task requester client computing systems 350, task performer client computing systems 370, and other computing nodes 390 that support the task exchange system. In the illustrated embodiment, the server computing system 300 has components that include a CPU 305, various I/O components 310, storage 320, and memory 330. The I/O components include a display 311, a network connection 312, a computer-readable media drive 313, and other I/O devices 315 (e.g., a mouse, keyboard, etc.). The other computing systems 350 and 370 and the computing nodes 390 each may include similar components to those of the server computing system, but are not illustrated in detail here.

An embodiment of an interface portion of a task exchange system 340 is executing in memory, and it interacts with the client computing systems 350 and 370 over a network 380 using the network connection 312 (e.g., via the Internet and/or the World Wide Web, cellular network, etc.). In particular, users of task requester client computing systems 350 may interact with the system interface 340 in order to provide information about available tasks to be performed, as well as to perform other related interactions. Similarly, task performer users may use task performer computing systems 370 to interact with the system interface 340 to obtain information about available tasks and provide task performance results information, as well as to perform other related interactions.

As previously described, for at least some interactions initiated by the client computing systems 350 and 370, the system interface 340 responds by identifying an appropriate storage partition for a user associated with the interaction, and then directs a computing node associated with that storage partition to handle the interaction. In particular, in this example, the server computing system 300 is connected to multiple task exchange system alternative computing nodes 390 via another network 385 (e.g., a network internal to the task exchange system, such as if the computing nodes 390 are not directly accessible to external computing systems such as computing systems 350 and 370). Each of the alternative computing nodes 390 includes at least one storage partition 395 to store data for one or more types of users, and optionally one or more additional such storage partitions 397. While not illustrated in detail here, in some embodiments the computing nodes 390 may instead be of varying types (e.g., separated into requester nodes and performer nodes, such as to support different types of functionality corresponding to those types of users; separated by offering different types or levels of capabilities, such as if some computing nodes support higher levels of quality of service and/or include additional capabilities for use by premium customers; etc.).

When one of the computing nodes 390 is directed to handle an interaction with a user, or in response to other types of events, one or more software programs 393 executing on that computing node may perform various actions in response. For example, at least some of the computing nodes 390 each provide one or more services 391 that are available to other computing nodes 390, and in some situations the software program(s) 393 may invoke or otherwise interact with one or more remote services on other computing nodes as part of the response to the user interaction or other event. If so, as discussed in greater detail elsewhere, a service proxy manager system 397 executing locally on the computing node with the software program(s) 393 will receive the interactions, and will perform the interactions on behalf of the software program(s) 393 in an appropriate manner (e.g., by interacting with the remote services over a network, such as in a manner specific to the remote services; by operating in a local mode so as to interact with local copies of the remote services or other simulate interactions with the services; etc.).

In addition, in at least some embodiments and for some types of interactions, the system interface 340 may directly handle the interactions without directing the interactions to particular computing nodes 390. For example, the task exchange system may maintain some types of data in a general data store that is not distributed among the computing nodes 390, such as in a database 321 on storage 320. If so, the system interface 340 may respond to requests to access or change such data directly without using the computing nodes 390. In other embodiments, such general data may not be maintained and used. Furthermore, in some embodiments, the system interface 340 and/or other portions of the task exchange system may optionally be separated into multiple components that each provides one or more distinct types of functionality, although particular such components are not illustrated in this example embodiment.

Those skilled in the art will appreciate that computing systems and nodes 300, 350, 370 and 390 are merely illustrative and are not intended to limit the scope of the embodiments of the present disclosure. The task exchange system may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task exchange system and by the service proxy manager system may in some embodiments be provided via various components, and may be combined in fewer components or distributed in additional components than is described herein. Similarly, in some embodiments, the functionality of some of the components may not be provided as part of the task exchange system or the service proxy manager system, and/or other additional functionality may be available. As one particular example, in some embodiments a service proxy manager system may be implemented in a distributed manner by multiple proxy objects that each represents a remote software service or an operation corresponding to a remote software service.

Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
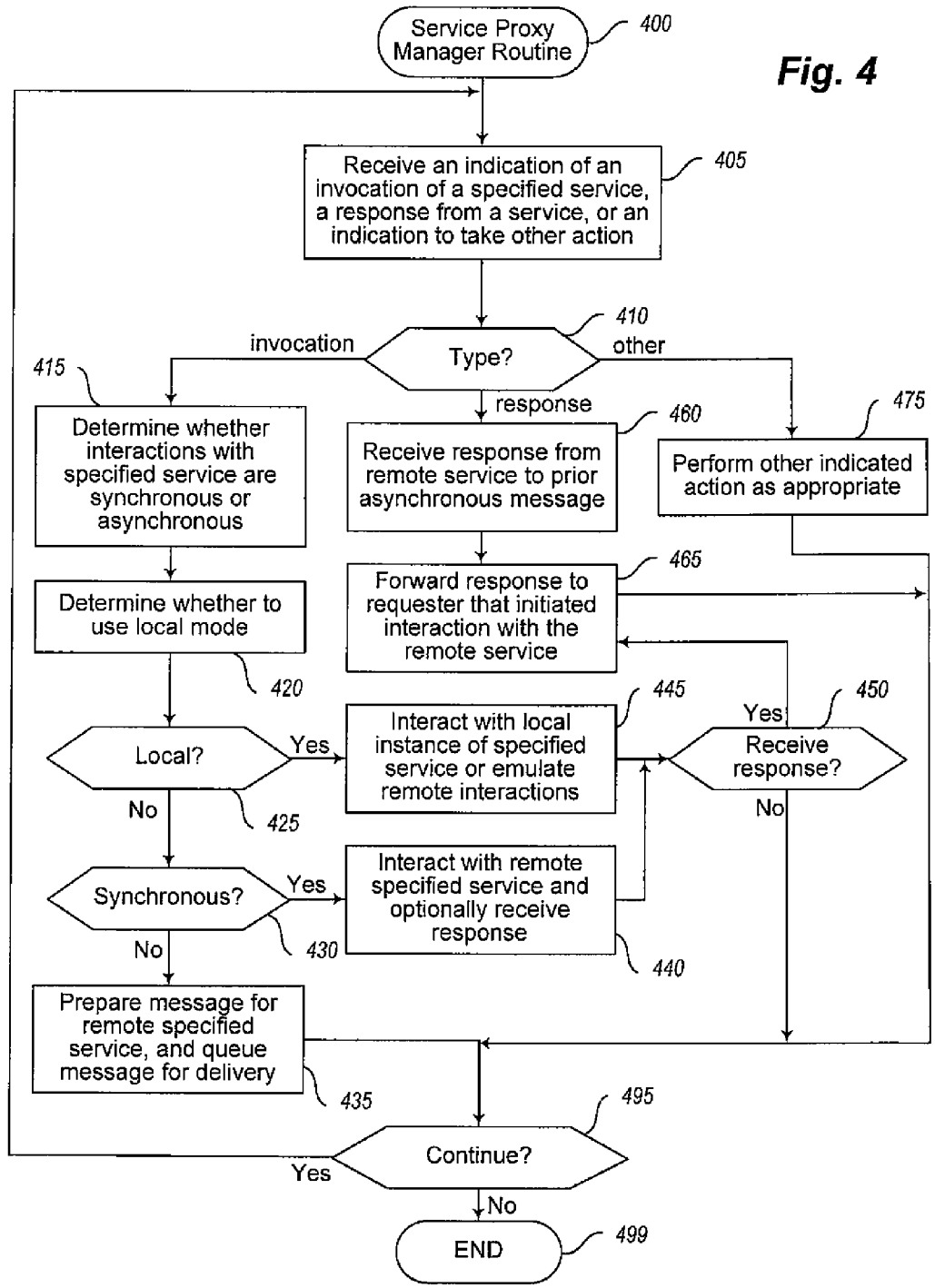
FIG. 4 illustrates a flow diagram of an example embodiment of a Service Proxy Manager routine.

FIG. 4 is a flow diagram of an example embodiment of a Service Proxy Manager system routine 400. The routine may be provided by, for example, execution of service proxy manager system 230z of FIGS. 2B-2C and/or of service proxy manager system 397 of FIG. 3, such as to provide enhanced interactions initiated by software programs and intended for remote software services. While the illustrated embodiment of the routine may enhance interactions with multiple remote software services, in other embodiments a similar routine may be performed by each of multiple distinct proxy objects that each represent a single remote service or a single operation provided by a remote service.

The illustrated embodiment of the routine 400 begins at block 405, where an indication is received of an invocation of a specified software service (e.g., by an executing software program, such as a software program executing locally to the service proxy manger system or instead from a remote software program), of a response received from a remote service to a prior interaction, or an indication of other data or to take other action. The routine continues to block 410 to determine the type of received indication, and continues to block 415 if it is determined that an indication was received of an invocation of or other initiated interaction with a specified software service. In block 415, the routine determines whether interactions with the specified service are to be performed in a synchronous or asynchronous manner, such as based on the type(s) of interfaces provided by the specified service. The routine then continues to block 420 to determine whether the interactions with the specified service are to occur using a local mode of operation, such as based on whether testing is currently being performed and/or on other current conditions.

If a local mode of operation is not currently in use, the routine continues to block 430 to determine whether the manner of interaction with the specified service is via synchronous communications. If not, the routine continues to block 435 to prepare a message for the remote specified service and to queue the message for later asynchronous delivery. If so, the routine instead continues to block 440 to interact with the remote specified service in a synchronous manner (e.g., via remote method invocation) and to optionally receive a response back on the synchronous interactions. If it was instead determined in block 425 that a local mode of operation is currently in use, the routine instead continues to block 445 to perform the intended interaction with the specified remote software service in a local manner, such as by interacting with a local copy of the remote service or other local software that represents the remote service, or by locally emulating or otherwise locally simulating at least some of the interactions with the remote service. After blocks 440 or 445, the routine continues to block 450 to determine whether a response was received based on the interactions performed in blocks 440 or 445. If so, the routine continues to block 465 to forward the received response to the software program or other client that initiated the invocation of the specified service that was received in block 405.

If it was instead determined in block 410 that the type of received indication in block 405 was a response from a remote software service to a prior asynchronous interaction initiated with the remote service, the routine continues to block 460 to receive the response. The routine then continues to block 465 to forward the received response to the software program or other client that initiated the prior asynchronous interaction. If it is instead determined in block 410 that the type of received indication in block 405 was of another form, such as an indication of other received data or to take other action, the routine continues to block 475 to respond to the received indication as appropriate (e.g., to take a specified action if appropriate). Such other indications may be of various types in various embodiments, such as an expiration of a timer or other indicator to check an outgoing message queue for any messages to be sent, an expiration of a timer or other indicator to retry a prior interaction that failed, a request from an administrator to perform an administrative operation, etc.

After blocks 435, 465 or 475, or if it was determined in block 450 that a response was not received, the routine continues to block 495 to determine whether to continue. If so, the routine returns to block 405, and if not continues to block 499 and ends.

It will be appreciated that the illustrated embodiment of the routine may perform other actions in other embodiments. For example, while not illustrated here, in other embodiments the routine may provide responses or other status messages to a software program or other client from who an indication is received in block 405 of an invocation of a remote service other than as described in block 465, such as immediately in response to the receipt of the indication in block 405, after block 435 to indicate that an asynchronous message has been sent, after blocks 440 and/or 445 even if a response is not received (e.g., to indicate that the interactions have occurred), etc. In addition, in at least some embodiments, various interactions with software proxy objects may be performed, such as to allow appropriate software proxy objects to perform at least blocks 435, 440 and/or 445. It will further be appreciated that the task exchange system and/or service proxy manager system may have other components that provide a variety of other types of functionality as part of their operation, but that are not described in detail here.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method in a computing system for facilitating interactions between a software program executing on the computing system and one or more software services external to the computing system, the method comprising:
   under control of the computing system,
      providing one or more service proxy objects that each represent a remote software service provided by a remote computing system;
      receiving indications of multiple invocations performed in a synchronous manner by a software program executing on the computing system, each invocation being of one of the service proxy objects so as to access capabilities of the software service represented by that service proxy object; and
      automatically responding to each of the multiple invocations by,
         determining a first manner of accessing the capabilities of the software service represented by the invoked service proxy object, the determined first manner indicating whether interactions with the represented software service are to be performed in a synchronous or asynchronous manner;
         determining a second manner of accessing the capabilities of the software service represented by the invoked service proxy object, the determined second manner being based on whether testing is being performed in such a manner that the interactions with the represented software service are to occur locally on the computing system without communicating with the remote computing system that provides the represented software service;
         accessing the capabilities of the software service represented by the invoked service proxy object in accordance with the determined first and second manners, the accessing of the capabilities being performed on behalf of the software program but in a manner such that the determined first and second manners used for the accessing are concealed from the software program.

2. The method of claim 1 wherein the determined first manner of accessing the capabilities of the software service represented by one of the invoked service proxy objects includes performing interactions with that represented software service in an asynchronous manner, and wherein the accessing of the capabilities of that represented software service includes generating a message that is intended for that represented software service and storing the generated message in a message queue on the computing system for later delivery to the represented software service.

3. The method of claim 2 wherein the accessing of the capabilities of the software service represented by the one invoked service proxy object includes, before receiving a response from the represented software service to the generated message, providing to the executing software program a response to the invocation of the one service proxy object.

4. The method of claim 2 wherein the invocation of the one service proxy object in the synchronous manner by the software program includes the software program synchronously invoking an interface method of the one service proxy object.

5. The method of claim 1 wherein the determined second manner of accessing the capabilities of the software service represented by one of the invoked service proxy objects includes performing interactions with that represented software service locally on the computing system without communicating with the remote computing system that provides the represented software service, the performing of the interactions locally occurring due to testing being performed, wherein the software program executes on the computing system as part of a process, and wherein the accessing of the capabilities of that represented software service includes executing a copy of the represented software service on the computing system as part of the process with the executing software program, and includes interacting with the executing copy of the represented software service.

6. The method of claim 1 wherein testing is being performed for the invoking of one of the service proxy objects, wherein the determined second manner of accessing the capabilities of the software service represented by the one invoked service proxy object includes performing interactions with that represented software service locally on the computing system without communicating with the remote computing system that provides that represented software service, wherein the determined first manner of accessing the capabilities of that represented software service includes performing interactions with that represented software service in an asynchronous manner, and wherein the accessing of the capabilities of that represented software service includes emulating asynchronous message interactions with that represented software service.

7. The method of claim 1 wherein the computing system is one of multiple computing systems providing a computer-implemented task exchange system that acts as an intermediary to facilitate performance by human task performer users of tasks from task requester users, wherein the executing software program provides capabilities to one or more human task performer users who have related data stored by the computing system, and wherein the accessing of the capabilities of the software services represented by the invoked service proxy objects includes accessing data related to one or more task requester users who have related data being stored by one or more remote computing system, so as to facilitate performance of tasks by the one or more human task performer users.

8. The method of claim 1 wherein the one or more service proxy objects each include software, wherein the providing of the one or more service proxy objects includes executing at least some of the software for one or more service proxy objects on the computing system, and wherein the automatic responding to each of the multiple invocations is performed under control of the executing software for the one or more proxy objects.

9. The method of claim 1 wherein the automatic responding to each of at least some of the multiple invocations includes, after the accessing of the capabilities of the software service represented by the invoked service proxy object, providing a response to the executing software program based at least in part on the accessed capabilities.

10. A computer-implemented method for facilitating interactions between a software program and external software services, the method comprising:
   receiving an indication of a first synchronous invocation that is performed by a software program executing on a computing system to access capabilities of a first software service that is external to the computing system, the first invocation being of a first proxy on the computing system that represents the first software service;
   under control of the first proxy, accessing the capabilities of the first software service on behalf of the software program by interacting with the first software service in a synchronous manner;
   receiving an indication of a second synchronous invocation that is performed by the executing software program to access capabilities of a second software service that is external to the computing system, the second invocation being of a second proxy on the computing system that represents the second software service; and
   under control of the second proxy, accessing the capabilities of the second software service on behalf of the software program by interacting with the second software service in an asynchronous manner, the interacting such that the asynchronous manner of the interacting is transparent to the software program.

11. The method of claim 10 wherein the interacting with the first software service in the synchronous manner includes interacting over a network with a remote computing system that provides the first software service.

12. The method of claim 11 wherein the interacting with the first software service in the synchronous manner includes performing a remote method invocation of the first software service on the remote computing system.

13. The method of claim 10 wherein the interacting with the second software service in the asynchronous manner includes interacting over a network with a remote computing system that provides the second software service.

14. The method of claim 13 wherein the interacting with the second software service in the asynchronous manner includes generating a message that is intended for later delivery to the second software service on the remote computing system.

15. The method of claim 14 wherein the interacting with the second software service in the asynchronous manner further includes storing the generated message in a message queue on the computing system for later delivery.

16. The method of claim 10 wherein the first software service is provided by a remote computing system, and wherein the interacting with the first software service in the synchronous manner is performed in a manner local to the computing system and without interacting with the remote computing system that provides the first software service.

17. The method of claim 16 wherein the interacting with the first software service in the manner local to the computing system includes interacting with a local copy of the first software service that is provided by the computing system.

18. The method of claim 16 wherein the interacting with the first software service in the manner local to the computing system includes simulating interactions with the first software service.

19. The method of claim 16 wherein the interacting with the first software service in the manner local to the computing system is performed based at least in part on testing being performed in conjunction with the first synchronous invocation.

20. The method of claim 16 wherein the interacting with the first software service in the manner local to the computing system is performed based at least in part on an indication to temporarily use a local mode of interaction for the first synchronous invocation.

21. The method of claim 16 wherein the second software service is provided by a remote computing system, and wherein the interacting with the second software service in the asynchronous manner is performed in a manner local to the computing system and without interacting with the remote computing system that provides the second software service.

22. The method of claim 10 wherein the interacting with the first software service in the synchronous manner is performed in response to the first synchronous invocation and includes interacting over a network with a remote computing system that provides the first software service, and wherein the method further comprises:
   receiving an indication of a third synchronous invocation that is of the first proxy and is performed by the executing software program to access capabilities of the first software service; and
   under control of the first proxy and in response to the third synchronous invocation, accessing the capabilities of the first software service on behalf of the software program by interacting with a local copy of the first software service that is provided by the computing system.

23. The method of claim 22 wherein the interacting with the local copy of the first software service in response to the third synchronous invocation is performed based at least in part on testing being performed, and wherein the interacting over the network with the remote computing system that provides the first software service in response to the first synchronous invocation is performed based at least in part on testing not being performed.

24. The method of claim 10 wherein the second software service is provided by a remote computing system, and wherein the interacting with the second software service in the asynchronous manner is performed in a manner local to the computing system and without interacting with the remote computing system that provides the second software service.

25. The method of claim 24 wherein the interacting with the second software service in the asynchronous manner includes emulating asynchronous message interactions with the second software service.

26. The method of claim 10 wherein the first proxy is a first object that provides to the software program a first interface corresponding to an interface of the first software service, and wherein the second proxy is a second object that provides to the software program a second interface corresponding to an interface of the second software service.

27. The method of claim 10 wherein the first and second proxies each include executable software, wherein the method is performed by the computing system, and wherein the method further comprises executing the included software of the first and second proxies.

28. The method of claim 27 wherein the first software service is executing on a remote computing system and includes software to provide the capabilities of the first software service, and wherein the executable software of the first proxy includes software for controlling interactions with the first software service on the remote computing system so as to access those provided capabilities.

29. The method of claim 27 wherein a testing mode is currently in use, and wherein the executable software of the first proxy includes software to locally provide the capabilities of the first software service while the testing mode is in use.

30. The method of claim 27 further comprising executing the software program.

31. The method of claim 30 wherein the software program and the included software of the first and second proxies all execute in a single process on the computing system.

32. The method of claim 10 wherein the first software service performs multiple distinct operations that each correspond to a distinct subset of the capabilities of the first software service, wherein the first proxy provides multiple distinct interfaces that each correspond to one of the multiple operations of the first software service, and wherein the first invocation of the first proxy by the executing software program is of a first of the multiple interfaces so as to access the subset of the capabilities of the first software service that correspond to the first interface.

33. The method of claim 32 wherein the first interface of the first proxy corresponds to a first synchronous operation performed by the first software service, wherein a distinct second interface of the first proxy corresponds to a distinct second asynchronous operation performed by the first software service, and wherein the method further comprises:
  receiving an indication of a third synchronous invocation that is of the second interface of the first proxy by the executing software program to access the subset of the capabilities of the first software service that correspond to the second interface; and
  under control of the first proxy and in response to the third synchronous invocation, accessing the subset of the capabilities of the first software service that correspond to the second interface on behalf of the software program by interacting with the first software service in an asynchronous manner.

34. The method of claim 10 wherein the interacting with the first software service includes providing a response to the executing software program based at least in part on the interacting.

35. The method of claim 10 wherein the computing system is one of multiple computing systems providing a computer-implemented task exchange system that acts as an intermediary to facilitate performance by human task performer users of tasks from task requester users, wherein the executing software program provides capabilities to one or more users of the task exchange system, and wherein the accessing of the capabilities of the first and second software services is part of performing activities related to performance of one or more tasks based on data stored by one or more other of the multiple computing systems.

36. The method of claim 35 wherein the executing software program provides capabilities to one or more task performer users, and wherein at least one of the first and second synchronous invocations is related to performing one or more tasks supplied by other users.

37. The method of claim 10 wherein the executing software program provides capabilities to one or more task requester users, and wherein at least one of the first and second synchronous invocations is related to supplying one or more tasks to be performed by other users.

38. A non-transitory computer-readable medium whose contents enable a computing system to facilitate interactions with remote services, by performing a method comprising:
  receiving an indication of a synchronous interaction initiated by executing software to access capabilities of a remote service; and
  under control of a local software representation of the remote service and in response to the initiated synchronous interaction, automatically accessing the capabilities of the remote service by asynchronously interacting with the remote service such that the asynchronous manner of the interacting is transparent to the executing software.

39. The non-transitory computer-readable medium of claim 38 wherein the local software representation of the remote service is a software proxy executing on the computing system, wherein the executing software is a software program executing on the computing system, wherein the remote service is a service provided by another computing system, and wherein the initiated synchronous interaction is an invocation of a method provided by the software proxy.

40. The non-transitory computer-readable medium of claim 38 wherein the method further comprises:
  receiving an indication of a second synchronous invocation by the software that is of a second software proxy that represents a second remote service; and
  in response to the second synchronous invocation, automatically interacting with the second remote service in a synchronous manner to access capabilities of the second remote service for the software program.

41. The non-transitory computer-readable medium of claim 38 wherein the automatic accessing of the capabilities of the remote service includes, if a testing mode is currently in use, automatically providing the capabilities of the remote service in a manner local to the computing system and without interacting with a remote computing system that provides the remote service, and wherein the asynchronous interacting with the remote service is performed only if the testing mode is not currently in use.

42. The non-transitory computer-readable medium of claim 38 wherein the computer-readable medium is at least one of a memory of a computing system and a data transmission medium transmitting a generated data signal containing the contents.

43. The non-transitory computer-readable medium of claim 38 wherein the contents are instructions that when executed cause the computing system to perform the method.

44. A computing system configured to facilitate interactions with remote software services, comprising:
  one or more memories; and
  one or more proxy components that each correspond to a remote service provided from another computing system, and that are each configured to provide access to capabilities of the corresponding remote service for the proxy component, by:
    receiving an indication of an invocation of the proxy component by a local software program so as to access the capabilities of the corresponding remote service for the proxy component;

if a testing mode is not currently in use, automatically interacting with the corresponding remote service for the proxy component in an asynchronous manner to access the capabilities of the remote service, such that the asynchronous manner of the interacting is transparent to the local software program; and if a testing mode is currently in use, automatically providing the capabilities of the corresponding remote service for the proxy component in a manner local to the computing system that is performed without interacting with the another computing system that provides the remote service, such that the local manner of the providing of the capabilities is transparent to the local software program.

45. The computing system of claim 44 wherein the one or more proxy components are each a software proxy object that provides one or more interface methods, and wherein the computing system further comprises the local software program, the local software program being configured to perform invoking of each of the one or more software proxy objects by synchronously invoking an interface method of the software proxy object.

46. The computing system of claim 44 further comprising: one or more other proxy components that each correspond to a remote service provided from another computing system, and that are each configured to provide access to capabilities of the corresponding remote service, by:

receiving an indication of an invocation of the other proxy component by a local software program so as to access the capabilities of the corresponding remote service for the other proxy component;

if a testing mode is not currently in use, automatically interacting with the corresponding remote service for the proxy component in a synchronous manner to access the capabilities of the remote service; and if a testing mode is currently in use, automatically providing the capabilities of the corresponding remote service for the proxy component in a manner local to the computing system and without interacting with the another computing system that provides the remote service.

47. The computing system of claim 44 wherein the one or more proxy components each includes software instructions for execution by the computing system.

* * * * *